Feb. 10, 1959    P. A. FRANK ET AL    2,872,783
JET PULSE ENGINE AND STARTING AND RUNNING FUEL SYSTEM
Filed May 9, 1955    4 Sheets-Sheet 1
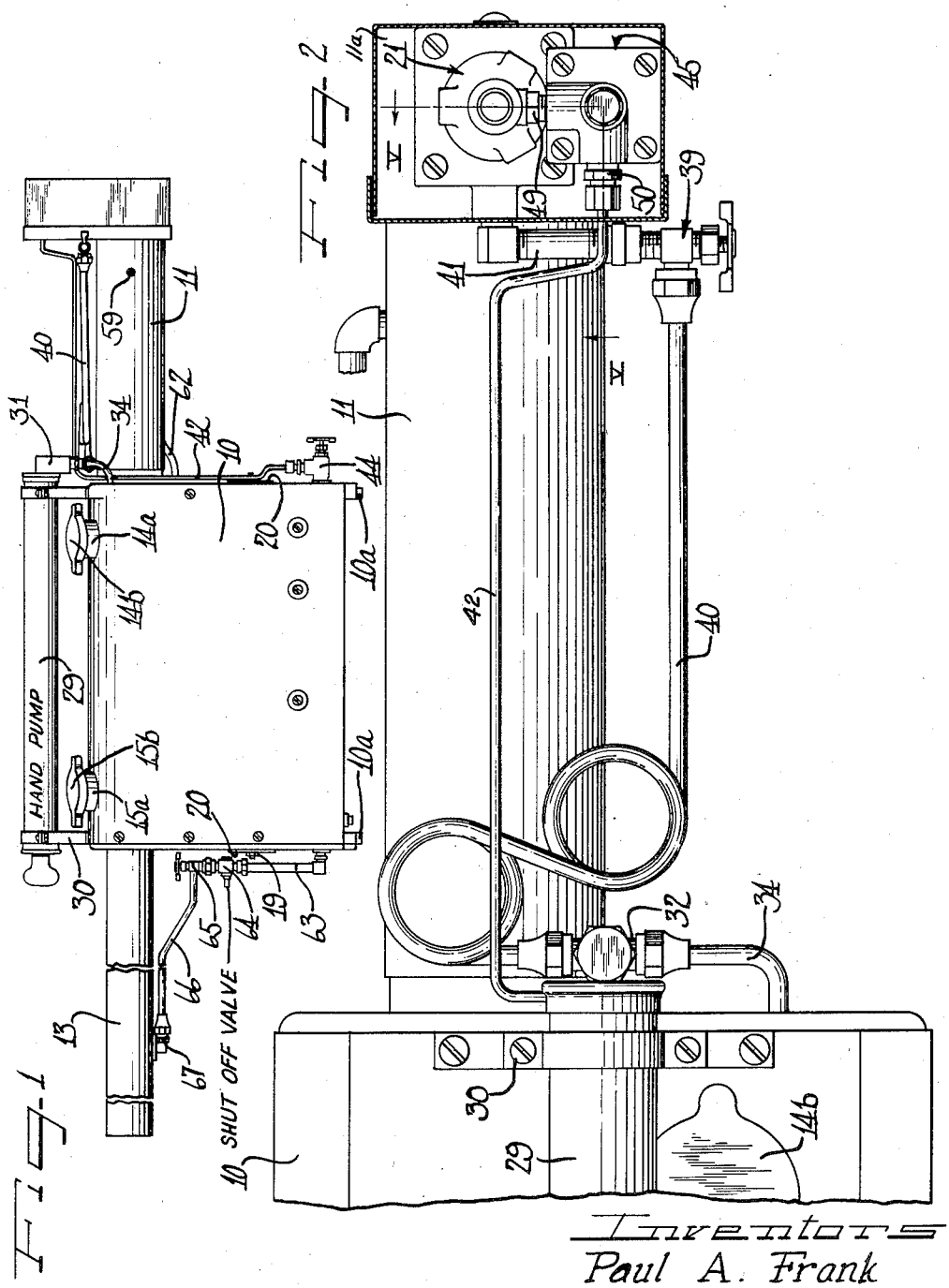
Inventors
Paul A. Frank
Russell R. Curtis
Attys

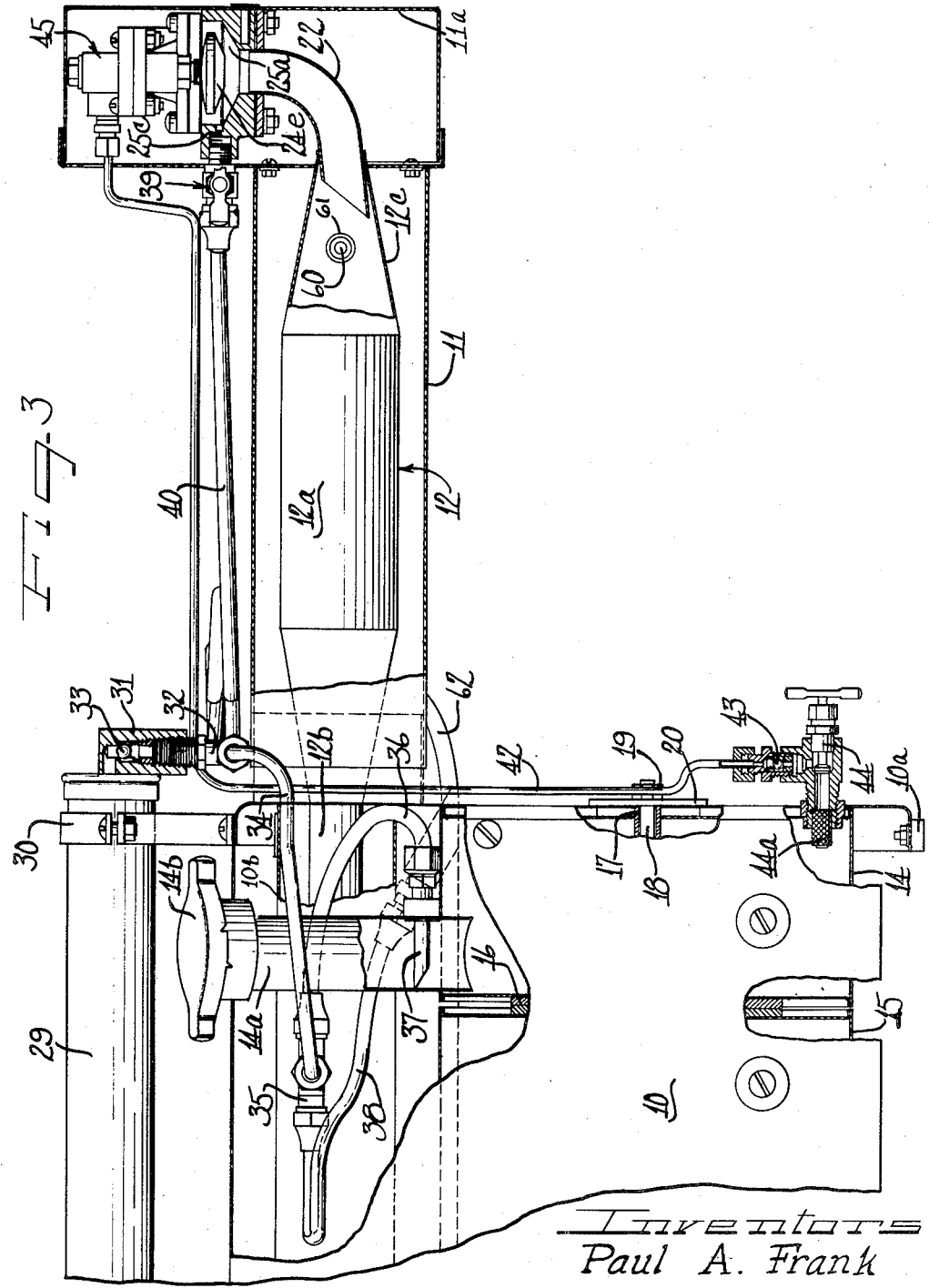

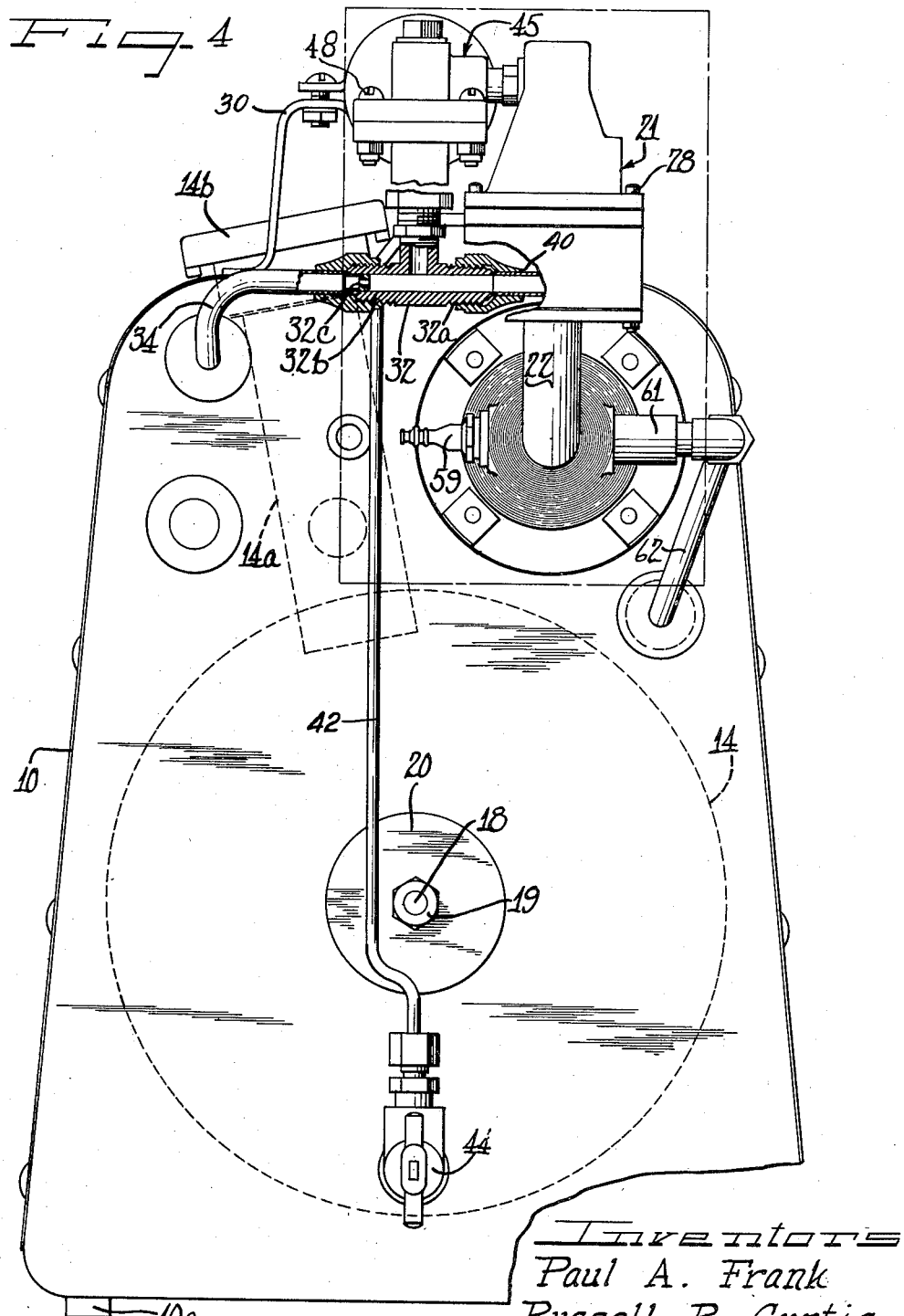

Feb. 10, 1959  P. A. FRANK ET AL  2,872,783
JET PULSE ENGINE AND STARTING AND RUNNING FUEL SYSTEM
Filed May 9, 1955  4 Sheets-Sheet 4
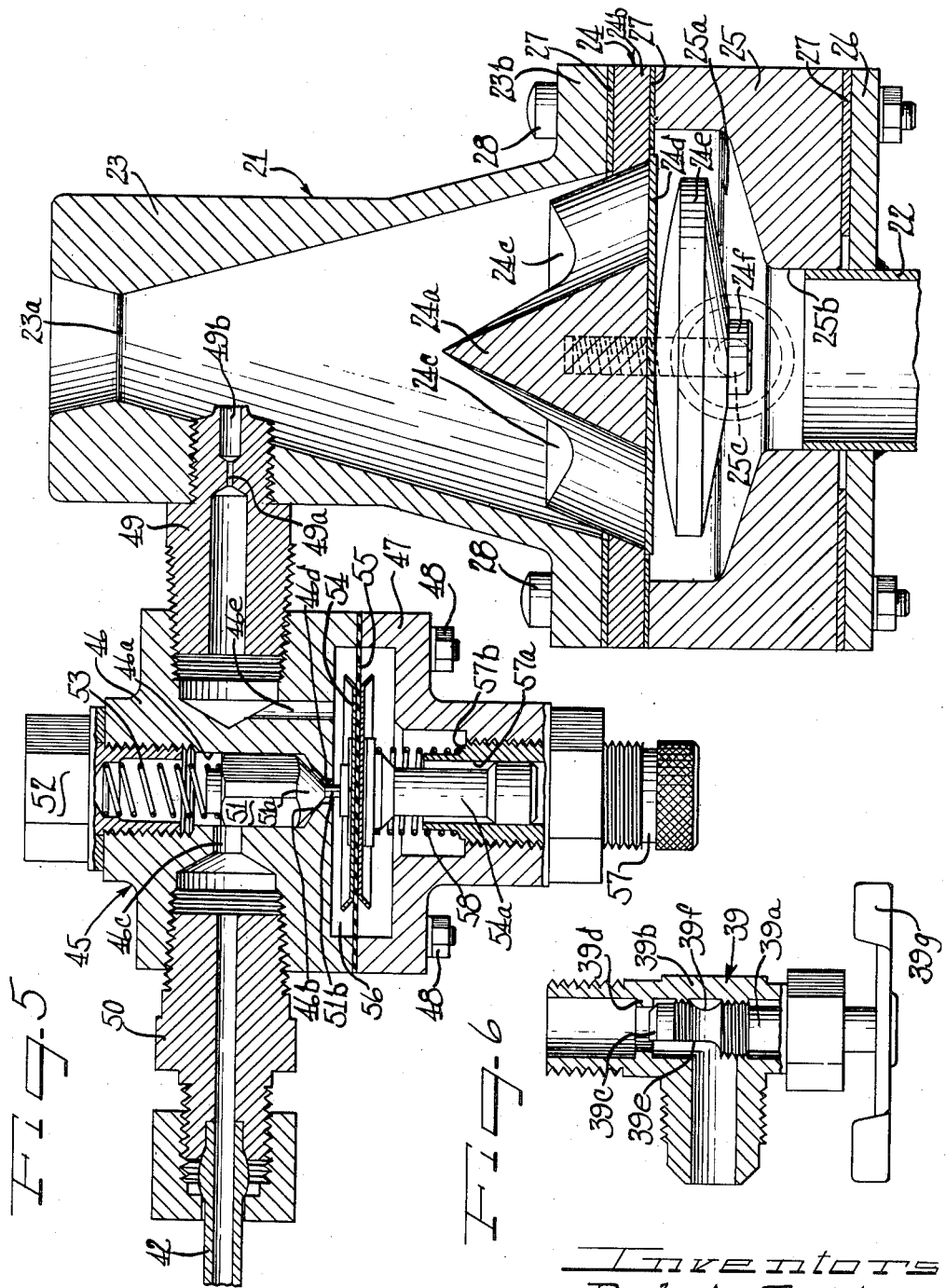
Inventors
Paul A. Frank
Russell R. Curtis United States Patent Office 2,872,783
Patented Feb. 10, 1959

2,872,783

JET PULSE ENGINE AND STARTING AND RUNNING FUEL SYSTEM

Paul A. Frank, Bedford, and Russell R. Curtis, Bedford Heights, Ind., assignors to Curtis Automotive Devices, Inc., Bedford, Ind., a corporation of Ohio Application May 9, 1955, Serial No. 506,704

13 Claims. (Cl. 60—39.14)

This invention relates to resonant pulse jet engines primarily useful for generating fogs and mists from any suitable ingredients, or for any useful work developed by resonant pulsation of exploding fuel charges.

Specifically, the invention deals with a fuel system for pulse jet engines which is capable of maintaining a substantially constant air fuel mixture ratio, notwithstanding the variation in combustion chamber pressure or other operating conditions.

Pulse jet engines, in general, include an inlet air-receiving passage into which fuel is aspirated to produce a fuel charge, and a pulsating or vibrating valve intermittently admits the fuel charge to a combustion chamber. The charge is ignited in the combustion chamber and the pressure of the burning gases causes a rapid discharge of gases out of an elongated exhaust tube or tail pipe to produce a jet thrust. The back pressure created by an ignited fuel charge or explosion in the combustion chamber also acts to close the vibrating valve whereupon inertia of the gases in the exhaust tube produces a reduced pressure condition in the combustion chamber which is below atmospheric pressure. This reduced pressure condition causes a reverse flow in the exhaust tube forcing a portion of the hot residual combustion gases back into the combustion chamber to open the vibrating valve and draw in a fresh fuel charge. This dual reverse flow continues until the fresh charge is heated sufficiently to be ignited whereupon the valve is again closed and the additional jet thrust from the newly introduced fuel charge is produced in the exhaust tube. The resonance of the system is effective to develop an orderly succession of pulses to establish a definite operating cycle.

Heretofore, some difficulty has been encountered in the operation of pulse jet engines in respect to both starting and running conditions. In some cases, starting has been troublesome due to the difficulty in providing a proper air-fuel mixture ratio for the combustion chamber, and the fire hazard has been great if for any reason the engine stalls, due to the continued fuel flow. In addition, the change-over from starting condition to running condition has been difficult, and the air-fuel mixture ratio has been affected by variation in combustion chamber pressure thereby affecting the operation and efficiency of the engine.

The present invention now provides a fuel system for a pulse jet engine including a pressure actuated fuel regulator providing a consistent metered fuel flow to a jet engine. A hand starting pump is provided to initially place fuel in a fuel tank under pressure and deliver same to the fuel regulating valve. A restrictive orifice coacts with the valve to meter the flow of fuel to the engine. The hand pump also functions to deliver pressurized air to an antechamber located on the downstream side of the vibrating engine valve to initially vaporize the fuel entering the combustion chamber. A check valve is provided in the outlet of the hand pump to prevent the back flow of air thereto and allow the air lines connecting to the antechamber and the fuel tank to function and provide a path between the antechamber and the fuel tank during running condition of the engine for placing the fuel tank under pressure. A choke valve is provided in the air line connecting the antechamber and the hand pump to proportionate the air flow from the pump between the antechamber and the fuel tank.

It is then an object of this invention to provide a resonant pulse jet device equipped with essential elements serving a double purpose under starting and running conditions.

A further object of this invention is to provide a resonant pulse jet apparatus provided with a fuel system which permits the quick and easy starting of the engine.

Another object of this invention resides in the provision of a resonant pulse jet engine which stops fuel flow immediately if the engine stalls, thereby eliminating fire hazard from this source.

Still another object of this invention is to provide a portable aerosol generator unit having a pulse jet engine equipped with a fuel system arrangement which provides an air-fuel mixture ratio that is substantially unaffected by the attitude in which the unit is placed unless the fuel tank inlet be uncovered, thereby greatly enhancing the portability of the unit.

Still a further object of this invention resides in the provision of a resonant pulse jet engine adapted to be utilized in connection with an aerosol generating unit, wherein the engine is equipped with a fuel system having a metering or regulating valve that will maintain a predetermined desired fixed inlet fuel flow notwithstanding the variations in pressures on the fuel in the tank or variations in relative levels of the engine fuel in the fuel tank.

A further object of this invention is to provide an aerosol generator powered by a resonant pulse jet engine having a regulating valve in the fuel system which assures an air-fuel mixture ratio that is substantially unaffected by variation in combustion chamber pressure or the forces of acceleration and deceleration such as caused by normal or rough handling.

Still a further object of this invention is to provide a resonant pulse jet engine equipped with a regulatory fuel system which is manually started with the aid of a hand pump, wherein the change-over from the starting phase to the running phase is substantially instantaneous and fuel is fed to the engine immediately upon the first explosion.

Other objects, features and advantages of the invention will be apparent from the following detailed description of the drawings which by way of a preferred example only, illustrates the invention.

On the drawings:

Figure 1 is a broken longitudinal view of a portable aerosol generating unit powered by a resonant pulse jet engine in accordance with the invention;

Figure 2 is an enlarged fragmentary plan view of the fuel and air intake end of the unit shown in Figure 1, particularly illustrating the components of the fuel system;

Figure 3 is an enlarged fragmentary side elevational view of the rear section of the generating unit shown in Figure 1, with parts in vertical cross section and with parts broken away to show underlying parts of the resonant pulse jet engine equipped with the novel fuel system in accordance with the invention;

Figure 4 is an enlarged fragmentary end elevational view of the generating unit of Figure 1 looking in the direction of the jet discharge, with some parts in vertical cross section and some parts broken away to illustrate underlying parts of the fuel system for resonant pulse jet engines, and with some parts in dotted or phantom view to illustrate their disposition with respect to other parts illustrated by solid lines;

Figure 5 is a greatly enlarged cross sectional view, with some parts in elevation, of the fuel regulating valve and the engine valve assembly of a pulse jet engine according to the invention, taken substantially along line V—V of Figure 2; and Figure 6 is an enlarged cross sectional view, with parts in elevation, of the choke valve according to the invention which proportionates air received from the hand pump between the fuel tank and the engine antechamber.

As shown on the drawings:

As seen in Figure 1, the fog generator embodying the resonant pulse jet engine fuel system of the present invention includes generally a large central upstanding housing 10 having ground supporting legs 10a, a rearwardly extending tubular housing 11 for principally enclosing the enlarged tubular combustion chamber portion 12a of the pulse jet engine 12 (see Fig. 3), and a smaller forwardly extending tubular housing 13 for enclosing the free end of the discharge tube or tail pipe 12b of the engine 12. Within the housing 10, a tubular casing 10b is supported which encloses that part of the tailpipe 12b extending therethrough.

As seen in Figure 3 and Figure 4 a cylindrical fuel tank 14 and a cylindrical fog producing ingredient tank 15 are mounted in end to end relationship within the central housing or casing 10 of the generator. Suitable resilient-shock absorbing material, as indicated by the numeral 16 in Figure 3, is disposed between the adjacent ends of the tanks 14 and 15 to function as a spacing medium and vibration insulating agent. To provide support for the tanks within the housing 10, each tank is centrally bored and sleeved, as shown with respect to the fuel tank 14 and indicated by the numeral 17 in Figure 3, to receive an elongated rod 18 which threadedly carries a holding nut 19 at each end. Suitable enlarged plate washers, as indicated by the numerals 20, 20 (see Fig. 1) are received on the ends of the rod 18 to be held in abutting relation by the nuts 19 against the end walls of the central housing 10. Access for filling the tanks is had through filling pipes 14a and 15a, respectively, which extend through the upper wall of housing 10 and are capped with air tight sealing covers 14b and 15b, respectively. Other or additional supporting means may be employed to support the tanks 14 and 15 with respect to the housing 10, such as sheet metal bands extending across the bottom cylindrical surface of the respective tanks and being secured to the side walls of the housing 10. These are not shown, since their attachment and location will be apparent to those skilled in the art in view of the above disclosure of the related elements.

The pulse jet engine 12 is suitably supported within the housings 10, 11 and 13 and is provided with a vertically disposed down draft engine valve assembly, generally indicated by the numeral 21. An elbow conduit 22 leads from the valve assembly 21 to connect with a diffuser section 12c of the engine 12 which extends to the combustion chamber section 12a.

The valve assembly 21 includes generally a head or venturi section 23, Figure 5, having a venturi throat or passage 23a and a substantially square mounting flange 23b, a valve supporting member 24 having a conical section 24a protruding into the venturi section and attached to a substantially square flange portion 24b of the valve supporting member 24 through a plurality of radially disposed vanes which define a plurality of radiating passages 24c, and a normally slightly open thin valve disk 24d covering the downstream open end of the passages 24c and held in position by a rigid circular back stop 24e clamped to the conical section 24a by a suitable bolt 24f.

An end member 25 underlies the valve supporting member 24 and is appropriately hollowed to define an antechamber 25a which receives the back stop 24e of the valve supporting member 24. The end member 25 is centrally bored at 25b to receive the upper end of elbow 22 which is suitably fastened, such as by welding to a substantially square flange member 26. Suitable gaskets or seals are provided between the abutting surfaces of the flange 23b of head member 23, the flange 24b of valve supporting member 24, the flange section or thicker section of the end member 25, and the flange 26 which supports the elbow 22, such as indicated by the numeral 27. Suitable fasteners, such as nut and bolt assemblies 28 are appropriately spaced and extend through the abutting sections of the valve assembly for uniting them to function as a single unit.

A hand pump 29 is longitudinally disposed over the central tank housing 10 and rigidly supported at each end by a pair of braces 30, 30. The output end of the pump 29, as seen most clearly in Figure 3, carries a downwardly extending internally threaded and passaged nipple 31 receiving a T fitting 32. A check valve 33 is suitably mounted in the passaged nipple 31 to prevent air or other gases from flowing back to the pump 29.

The T fitting 32 carries an outlet 32a, an outlet 32b, and a restrictive orifice 32c in the last outlet, as seen most clearly in Figure 4. Each outlet is threaded to receive a suitable flanged end of a piece of tubing and a coupling member. Connected to the outlet 32b is an air line or conduit 34 which extends outwardly from the opening and is bent to be disposed within the central housing 10 and connected to a distribution T fitting 35. From one outlet of the T fittting 35 a pipe or conduit 36 leads to a nozzle 37 which is supported on the top of the fuel tank 14 and terminates within the filling pipe 14a in an open end, while the other outlet of the T fitting communicates with a different portion of the tank 14 through a bent length of tubing 38.

The outlet 32a of the T fitting 32 is connected to a choke valve 39 through a length of tubing 40. The choke valve 39 is in turn connected to the antechamber 25a of the valve assembly of the engine through a pipe 41, as seen in Figure 2. The antechamber 25a is passaged at the one side, as indicated by the numeral 25c to communicate with the pipe 41.

The choke valve 39 is more clearly illustrated in Figure 6, and more accurately functions as a variable orifice since when fully closed it only restricts the flow of air therethrough. This valve includes a stem 39a threadedly received within the casing 39b, and terminating in a beveled face 39c adapted to coact with an internal rim 39d of the casing 39b. A cut out portion of the valve stem and face, as indicated by the numeral 39e communicates at all times with a grooved portion 39f of the stem to provide an air path from the inlet end of the valve to the outlet end. A valve handle 39g is rigidly secured to the outer end of the stem 39a to control the position of the stem within the casing 39b. Thus, air flow through the valve may not be stopped, but may be choked off to any desired extent, thereby allowing the choke valve 39 to proportionate the air flow received from the hand pump 29 between the fuel tank 14 and the antechamber 25a of the engine valve 21.

Fuel is fed to the venturi section of the engine valve 21 through a length of flexible tubing 42 which is connected adjacent the bottom of the fuel tank 14 through a check valve 43 and a conventional shut off valve 44; and to the engine valve 21 through a fuel regulator, generally designated by the numeral 45. A strainer 44a is carried at the inlet end of the fuel shut off valve 44 to prevent any large particles from entering the fuel system, and the check valve 43 prevents the back flow of fuel to the fuel tank 14. While it is noted that the fuel line 42 runs from the shut off valve 44 upward along the rear end of the central housing 10 to the top thereof and bent substantially through a 90° angle to substantially parallel the rear tubular housing 11 before connecting to the fuel regulator 45, it is to be understood that this is merely illustrative and the tubing may run along the bottom of the tubular housing 11 before connecting to the fuel regulator 45. A rectangularshaped housing 11a is secured to the outer end of the rear tubular housing 11 to enclose the fuel regulator and the engine valve assembly. Of course, an opening will be provided in the top of housing 11a to allow air to enter the valve assembly 21.

As seen in Figure 5 the fuel regulator 45 includes a housing having an upper section 46 suitably fastened to a lower section 47, such as by nut and bolt assemblies 48. The fuel regulator 45 is principally supported by a centrally passaged union 49 having a tapered threaded portion on one end received in the upper section 46 of the regulator and threadedly received at the other end in the upper side wall of the valve engine head member 23. A restrictive orifice 49a is carried in the engine valve end of the union 49 for reasons hereinafter to be explained. A substantially similar union member 50 projects from an adjacent side of the upper casing section 46, as seen in Figure 2, and is suitably connected to the fuel line 42.

A vertical bore 46a extends from the top of casing section 46 to a valve seat 46b having an inclined face to coact with a conical valve face 51a of a vertically slidable and substantially triangular-shaped needle valve 51 which is received within the bore 46a. The bore 46a communicates with the union 50 through a passage 46c. A plug 52 carries a downwardly extending hollow reduced section which is threadedly received within the bore 46a of the upper casing section 46. A spring 53 is bottomed within the hollow of the plug 52 on one end and acts against the top of needle valve 51 urging it into seating position.

A pin 51b extends downwardly from the apex of the conical valve face 51a of the needle valve 51 and through aperture 46d.

The oppositely facing portions of the top and bottom casing sections 46 and 47 are suitably hollowed to receive a diaphragm clamp 54 which abuts on its upper side with the pin 51b of the needle valve 51 and coacts with the abutting faces of the upper and lower casing sections 46 and 47 to securely clamp a non-pervious diaphragm 55. The diaphragm coacts with the hollow end of the upper casing section 46 to define a pressure chamber 56.

The lower housing section 47 is centrally bored to threadedly receive an adjusting member 57 having an inner hollow bore 57a slidably receiving a guide rod 54a depending from the diaphragm clamp 54. An annular shoulder 57b is provided adjacent the inner end of the adjusting member 57 to bottom a spring 58 that also acts against the bottom of the diaphragm clamp 54. During normal operation of the fuel regulator 45, the adjusting member 57 is manipulated to slightly unseat the needle valve 51 as illustrated in Figure 5.

In the upper casing section 46 the union 49 communicates with the pressure chamber 56 through a vertically extending passage 46e.

In operation of the resonant pulse jet engine, during the starting conditions, air is delivered from the manual air pump 29 through pump check valve 33 to be distributed to the fuel tank 14 through the T fitting 32, air line 34, T fitting 35, and air lines 36 and 38; and to the antechamber 25a of the engine valve assembly 21 through the T fitting 32, the air line 40, the choke valve 39, the pipe 41 and the antechamber air orifice 25c, and proportionated thereto depending upon the adjustment of the choke valve 39. The configuration of air lines 36 and 38 is such as to permit fuel which may enter these lines when the entire fog generator is tilted severely to promptly drain back to the fuel tank 14 and not pass into line 34 whence it might find its way to the antechamber of the engine and upset carburetion.

Each time the air pump 29 is stroked, the fuel tank 14 is pressurized momentarily thereby causing fuel to flow momentarily through the filter 44a, the shut off valve 44, the check valve 43, and through the fuel line 42 into the fuel regulating valve 45. When fuel reaches the regulating valve it passes through the transverse passage 46c down along the sides of the triangular-shaped needle valve 51 through the slightly normally open port 46d into the pressure chamber 56 above the diaphragm 55, upwardly through the channel or vertical passageway 46e, across and through the orifice 49a and into the venturi section or head member 23. As already explained, the needle valve 51 is held just off its seat by opposed springs 53 and 58, and the adjusting member 57 is provided to affect this setting. Fuel flows each time the air pump 29 is actuated and stops flowing almost immediately after completion of the stroke since air from the fuel tank 14 escapes readily through the orifice 32c and into the antechamber 25a. Thus, normally during each complete pumping cycle, starting air flows first directly to the antechamber 25a through the air line 40 and to the fuel tank 14 through air lines 34, 36 and 38; and immediately thereafter from the fuel tank back through the orifice 32c in the T fitting 32 to the antechamber 25a. Hence, with each stroke cycle, the fuel tank is first placed under pressure and then the pressure is released, thereby resulting in causing fuel flow through the fuel line 42 in intermittent fashion, starting and stopping with each complete stroke cycle.

If the air pump 29 is stroked too rapidly, the regulating valve 45 will limit the quantity of fuel passing into the venturi section 23, since the orifice 49a functions to restrict the fuel flow causing a pressure rise in the chamber 56 above the diaphragm 55, which causes the diaphragm 55 to move downwardly and seat the needle valve 51 which then imposes the greater restriction to fuel flow and causes the fuel pressure to drop. The function of the fuel regulator 45 is seen to be such as to limit the pressure rise within the chamber 56 between the needle valve 51 and the restrictive orifice 49a to thereby limit the fuel flow through the orifice. The quantity of fuel passing into the venturi section 23 is thus dependent largely upon the length of time the fuel tank is maintained under pressure.

Fuel issuing from the nozzle 49b drops by gravity and passes through the radiating valve passages 24c, spreading over the surfaces of the slightly open valve 24d to be distributed into the antechamber 25a before dropping through the elbow fitting 22. Air entering the antechamber 25a through the port 25c blows generally over the undersurface of the back stop 24e to vaporize the fuel passing thereby, and this mixture flows to the combustion chamber 12a of the jet engine 12 where it is ignited by a spark plug 59, shown in Figure 4.

Since it is well known that fuel vaporizes more readily at higher temperatures, than at lower temperatures, the quantity of fuel introduced through the fuel regulator 45 into the air with each stroke of the hand air pump must be adjustable in order to provide efficient and fast starting at various ambient temperatures. It has already been shown that the quantity of fuel delivered with each stroke of the air pump is largely dependent upon the length of time the fuel tank 14 is under pressure with each pumping cycle. To vary this length of time, the choke value 39 has been provided, which, when it is adjusted inwardly to its limit, the free flow of air directly from the pump 29 to the antechamber 25a is impeded, and a greater quantity of air from each pump stroke thereby flows into the fuel tank. This greater quantity of air in the fuel tank 14 requires a longer time to escape through the orifice 32c, thereby placing the fuel tank under pressure for a longer time during each pumping cycle. When the choke valve 39 is adjusted to its open position, air flows quite freely through the air line 40 from the pump 29 to the antechamber 25a, while very little air flow into the fuel tank takes place, thereby obviously shortening the length of time the fuel tank 14 is under pressure and decreasing the quantity of fuel delivered to the fuel regulator 45 and venturi section 23 with each pump stroke.

Immediately after occurrence of the first explosion in the combustion chamber 12a of the pulse jet engine 12, air rushes in through the venturi 23 in the manner well known as to the operation of pulse jet engines. Reduced pressure (less than atmospheric) resulting in the venturi 23 causes fuel to be drawn through the metering orifice 49a, and air rushing past the fuel nozzle 49b causes this fuel to break up and vaporize. This air fuel mixture is drawn into the combustion chamber and the next explosion takes place.

The fuel in fuel tank 14 is maintained under pressure above atmospheric since the average pressure within the antechamber 25a is greater than atmospheric when the engine 12 is running, and during the running operation of the engine, the antechamber pressure is transmitted to the fuel tank 14 through the antechamber port 25c, the pipe 41, the choke valve 39, the air line 40, through the T fitting 32, the air line 34, and air lines 36 and 38. The choke valve 39 plays no part in the operation of the running system, and check valve 33 prevents back flow of gases into the air pump 29. Thus, fuel continues to be fed from the fuel tank to the regulating valve 45 which now functions to maintain a substantially constant pressure just in advance of the metering orifice 49a, notwithstanding the variation in combustion chamber pressure. A constant pressure in the regulating valve 45 together with a substantially constant lesser pressure in the venturi section 23 results in a constant rate of fuel flow through the orifice 49a, regardless of variation of pressure at the inlet to the regulating valve 45, provided that this inlet pressure is substantially above that desired to be established ahead of the metering orifice 49a.

Thus, it is noted that the air-fuel mixture ratio for the engine is substantially unaffected by the forces of acceleration and deceleration such as caused by normal or rough handling, by variation in combustion chamber pressure, or by the attitude in which the complete unit is placed unless the fuel inlet at the fuel tank be uncovered. Moreover, it is seen that the present invention provides a fuel system having essential components serving a double purpose for both starting and running conditions, and that change-over from the starting condition to the running condition is substantially instantaneous so that fuel is fed to the engine immediately upon the first explosion. And it is seen that if for any reason the engine stalls, the pressure within the antechamber 25a of the engine will immediately equalize to atmospheric pressure thereby instantly stopping fuel flow to the engine since pressure within the fuel tank will also immediately fall to zero. Hence, fire hazard from this source is eliminated.

The insecticide or other aerosol producing ingredients contained in the tank 15 are delivered to the discharge tube 12b of the engine near the open end thereof in much the same manner as the fuel from fuel tank 14 is delivered to the fuel regulating valve 45. The fluid in tank 15 is pressurized immediately following the first explosion of the engine when pressure at the head end of the combustion chamber is above atmospheric. As seen in Figure 3, an aperture 60 is provided in the side wall at the head end of the combustion chamber 12a in the diffuser passage 12c which communicates with the filling pipe 15a of the tank 15 through a pipe connection in the side wall of the diffuser chamber, as indicated by the numeral 61 in Figure 4, a length of tubing 62, the latter being in turn connected to the filling pipe 15a in much the same manner as the air tube 36 is connected to the filling pipe 14a of the fuel tank 14, as seen in Figure 3.

Now referring to Figure 1 an outlet at the bottom of the tank 15 connects to a vertical pipe line 63 which receives the pressurized fluid of the tank. From the pipe 63, the fluid travels through a shut off valve 64, a regulating valve 65, a forwardly extending tube length 66, and a tube connection 67 mounted on the bottom of the forwardly extending tubular housing 13, the tube connection 67 connecting into the discharge tube 12b of the engine 12 (not shown). Thus, fluid flow from the tank 15 to the discharge tube 12b of the engine 12 stops immediately upon the discontinuance of operation of the engine 12, but will flow during running operation regardless of the attitude of the generator unit so long as the tank outlet is not uncovered.

It will be understood that modifications and variations may be effected without departing from the scope of the novel concepts of the present invention, but it is understood that this application is to be limited only by the scope of the appended claims.

We claim as our invention:

1. A pulse jet engine including an elongated tubular body having an elongated exhaust tube portion, an enlarged combustion chamber portion communicating with said tube portion on one side thereof and a tapered diffuser passage portion converging from the opposite side of said combustion chamber portion, an antechamber communicating on one side with said diffuser passage through an elbow fitting and on the other side with a fuel and air control valve, a venturi section leading to said valve, a fuel regulating valve communicating with said venturi section through a restricted orifice, a fuel tank, said regulating valve connected to said tank, a hand pump for starting said engine being line connected to deliver air to said fuel tank and said antechamber, a check valve preventing the backflow of air to said pump, and a choke valve regulating the distribution of air from the pump to the antechamber and fuel tank air lines, whereupon after the starting of the engine pressure in the fuel tank is maintained through the antechamber and fuel tank air lines by the self-induced pressure in the antechamber.

2. A fuel system for a pulse jet engine having a combustion chamber, a valve providing an intermittent flow of fuel and air, an antechamber providing intercommunication between the valve and combustion chamber, and a venturi section leading to said valve, a fuel supply tank, a hand pump, air lines connecting said pump with the fuel tank and the antechamber, and a fuel line connecting the fuel tank with the venturi section whereupon operation of the hand pump initially places the fuel tank under pressure to feed fuel to the engine venturi section and initially delivers air to said antechamber for vaporizing the fuel passing therethrough.

3. A fuel system for a pulse jet engine having a combustion chamber, a valve providing an intermittent flow of fuel and air, an antechamber providing intercommunication between the valve and combustion chamber, and a venturi section leading to said valve, a fuel supply tank, a hand pump, air lines connecting said pump with the fuel tank and the antechamber, means in said air line connecting the pump and the antechamber for proportioning the air received by the pump between the tank and the antechamber, and a fuel line connecting the fuel tank with the venturi section whereupon operation of the hand pump initially places the fuel tank under pressure to feed fuel to the engine venturi section and initially delivers air to said antechamber for vaporizing the fuel passing therethrough.

4. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a hand pump, air lines connecting said pump with the fuel tank and the antechamber, a check valve in the outlet of the pump preventing the backflow of air, and a fuel line connecting the fuel tank with the engine venturi section whereupon operation of the hand pump initially places the fuel tank under pressure to feed fuel to the engine venturi section and initially delivers air to said antechamber for vaporizing the fuel passing therethrough.

5. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a hand pump, air lines connecting said pump with the fuel tank and the antechamber, a choke valve in the air line connecting the pump and the antechamber for proportioning the pressurized air developed by the pump between the tank and the antechamber, means preventing the backflow of air mounted in the pump outlet, and a fuel line connecting the fuel tank with the venturi section whereupon operation of the hand pump initially places the fuel tank under pressure to feed fuel to the engine venturi section and initially delivers air to said antechamber for vaporizing the fuel passing therethrough, and whereupon during the running of the engine the air lines and check valve coact to provide a path for pressurized air in said antechamber to the fuel tank and thereby maintain the fuel tank under pressure.

6. A fuel system for a pulse jet engine having a combustion chamber, a valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from the outlet to the fuel tank, a second line leading from the outlet to the antechamber, a choke valve in said second line for proportioning the pressurized air from said pump between the tank and the antechamber, and a fuel line connecting the tank with the venturi section, whereby operation of said pump pressurizes the fuel in the fuel tank to force fuel into the venturi and vaporizes the fuel passing through said antechamber.

7. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber during operation of the pump, a choke valve in said second line proportioning the output from the pump between the tank and the antechamber, a fuel line connecting the tank with the venturi section, and a fuel regulator in said fuel line limiting the fuel flow into the venturi section, whereby during running condition the lines leading from the pump cooperate with the check valve to provide a passage between the fuel tank and the now pressurized antechamber to maintain the fuel tank under pressure and continue fuel flow to the venturi.

8. A fuel system for a pulse jet engine having a combustion chamber, a valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a fuel line connecting the tank with the venturi section, and a fuel regulator in said fuel line limiting the fuel flow into the venturi section, said regulator being actuated by the fuel pressure therein.

9. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a choke valve in said second line proportioning the output from the pump between the tank and the antechamber, a fuel line connecting the tank with the venturi section, and a fuel regulator in said fuel line coacting with a restrictive orifice and being fuel pressure actuated to control the fuel feed to said venturi section.

10. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a choke valve in said second line proportioning the output from the pump between the tank and the antechamber, a fuel line connecting the tank with the venturi section, and a fuel regulator in said fuel line comprising a normally open spring biased needle valve and a diaphragm mounted in the regulator and connected to said needle valve, whereby said valve is actuated by fuel pressure acting on the diaphragm.

11. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a choke valve in said second line proportioning the output from the pump between the tank and the antechamber, a fuel line connecting the tank with the venturi section, and a fuel regulator in said fuel line comprising a normally open spring biased needle valve and a diaphragm mounted in the regulator and connected to said needle valve, said regulator coacting with a restrictive orifice connecting the former with the venturi section whereby actuation of the needle valve is obtained through fuel pressure acting on the diaphragm.

12. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a choke valve in said second line proportioning the output from the pump between the tank and the antechamber, a fuel line connecting the tank with the venturi section, and a fuel regulator in said fuel line comprising a normally open spring biased needle valve and a diaphragm mounted in the regulator and connected to said needle valve, said regulator coacting with a restrictive orifice connecting the former with the venturi section whereby actuation of the needle valve is obtained through fuel pressure acting on the diaphragm, and means for adjusting the needle valve to vary its response to the fuel pressure.

13. A fuel system for a pulse jet engine having a combustion chamber, an engine valve providing an intermittent flow of fuel and air, an antechamber providing intercommunication between the valve and combustion chamber, and a venturi section leading to said valve, a fuel supply tank, a manual starting pump having an outlet including a check valve mounted therein, a line leading from said outlet to the fuel tank to pressurize the fuel in said tank during operation of the pump, a second line leading from said outlet to the antechamber to vaporize fuel in said antechamber during operation of the pump, a choke valve in said second line proportioning the output from the pump between the tank and the antechamber, a fuel line leading from the fuel tank, a restrictive orifice in the side wall of the venturi section, and a pressure-actuated fuel regulator interconnecting said fuel line and said orifice, whereby said regulator maintains a substantially constant delivery of fuel to the venturi section and is substantially unaffected by the combustion chamber pressure.

References Cited in the file of this patent

UNITED STATES PATENTS

| | | |
|---|---|---|
| 943,833 | Leavitt | Dec. 21, 1909 |
| 1,167,555 | Gray | Jan. 11, 1916 |
| 1,191,195 | Kraus | July 18, 1916 |
| 2,638,739 | Barr | May 19, 1953 |
| 2,653,654 | Kamm et al. | Sept. 29, 1953 |
| 2,657,708 | Kamm et al. | Nov. 3, 1953 |
| 2,729,939 | Campbell | Jan. 10, 1956 |
| 2,791,271 | Kauffeld | May 7, 1957 |